J. C. VOGEL.

GROUND JOINT CONNECTION FOR ELECTRIC CONDUCTORS.

APPLICATION FILED APR. 24, 1912.

Reissued July 1, 1913. 13,589.

WITNESSES

P. F. Nagle.

L. Louville

BY

INVENTOR

John C. Vogel

Wiedersheim & Fairbank

ATTORNEYS

UNITED STATES PATENT OFFICE.

JOHN C. VOGEL, OF PHILADELPHIA, PENNSYLVANIA, ASSIGNOR TO THE FAIRMOUNT ELECTRIC AND MANUFACTURING COMPANY, A CORPORATION OF PENNSYLVANIA.

GROUND-JOINT CONNECTION FOR ELECTRIC CONDUCTORS.

13,589. Specification of Reissued Letters Patent. Reissued July 1, 1913.

Original No. 907,543, dated December 22, 1908, Serial No. 441,793. Application for reissue filed April 24, 1912. Serial No. 692,926.

*To all whom it may concern:*

Be it known that I, JOHN C. VOGEL, a citizen of the United States, residing in the city and county of Philadelphia, State of Pennsylvania, have invented a new and useful Ground-Joint Connection for Electric Conductors, of which the following is a specification.

My invention relates to a new and useful ground connection and consists of a new and useful means for connecting the same with a pipe, rod or other suitable conductor.

It further consists of other novel features of construction, all as will be hereinafter fully set forth.

Figure 1:
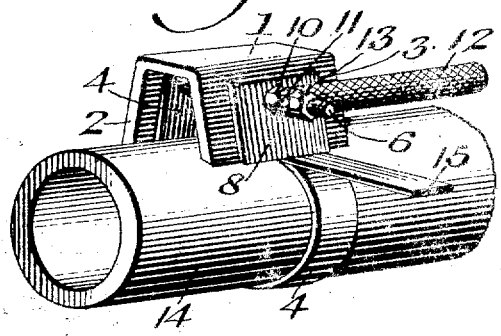
Figure 2:
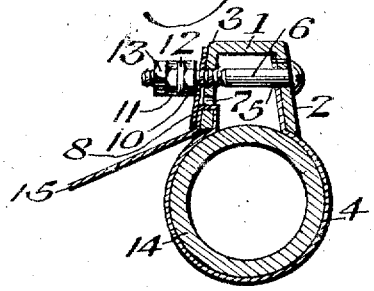
Figure 3:
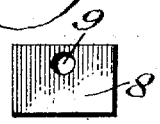
Figure 4:
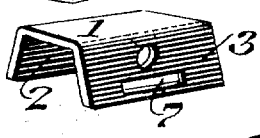

Figure 1 represents a perspective view of a ground connection embodying my invention. Fig. 2 represents a vertical sectional view thereof. Fig. 3 represents a view of the eccentric plate or lock for holding the band in position. Fig. 4 represents a perspective view of the body.

Similar numerals of reference indicate corresponding parts in the figures.

Referring to the drawings, I have found in practice in the ground connections for electrical conductors now in use that owing to the arrangement of the tightening means, the pipe or other support to which the connection is fastened, is apt to be destroyed or injured. My invention is designed to overcome this defect and to provide a new and novel connecting means which can be quickly and easily operated and in the drawings I have shown a construction for carrying out my invention but it will be evident that the arrangement of the parts may be varied and other instrumentalities may be employed which will come within the scope of my invention and I do not therefore desire to be limited in every instance to the exact construction as herein shown and described but desire to make such changes as may be necessary.

1 designates the body of my connection having the side plates 2 and 3 and to one of which is adapted to be connected a strip or band 4 in any suitable manner. I have shown the band having an opening 5 therein through which passes a threaded bolt or screw 6 which passes through suitable openings in the side walls 2 and 3, said bolt being adapted to hold the end of the band 4 in proper position with respect to the proper side plate, which in the present instance I have shown as 2. The band 4 is preferably flexible and of any suitable metal or other good conducting material. At a suitable point in the opposite plate from that to which the end of the band 4 is connected, in the present instance the side plate 3, I provide the slot or opening 7 through which the free end of the band is adapted to be passed from the inside.

8 designates a plate or lock which is mounted upon the screw or pin 6, which passes through an opening 9 in said plate, it being noted that said opening is preferably above the center of the plate, and that the lower portion thereof is adapted to contact with the portion of the band 4, after it has passed through the opening 7 when the said plate 8 is in its normal position, thus forming a lock.

10 designates a nut which is adapted to be placed upon the end of the screw or pin 6 and between which and a nut 11, is adapted to be secured, a conductor 12, a nut 13 holding the parts in position.

The operation of the device will be readily apparent: When the nuts 13, 11 and 10 are loose, the plate 8 can be swung around upon the pin or screw 6 from in front of the opening 7. The band 4 is placed around the pipe or conductor 14 and the end thereof is passed beneath the side plate 3 and through the opening 7 from the inside, the end 15 of the band extending outwardly. The plate 8 is now returned to its proper position in front of the opening 7 and the lower portion thereof abuts the portion of the band 4 in front of the plate 3. By tightening the screws the plate 8 is forced against the band holding or locking the same firmly in position while the two side plates 2 and 3 are compressed or caused to approach each other and movement of the free end 15 of the band is prevented by reason of its engagement with the side plate 3 and the lock 8. The band 4 is thus tightened around the conductor or pipe 14 and the connection is firmly and positively held in position. It will be seen that the device is easily and quickly placed in position by simply loosening the nuts 13, 11 and 10 a suitable amount and that the device is adapted for use upon any sized pipe or conductor 14 as any part of the band 4 can be engaged by the side plate 3 and the lock 8.

Having thus described my invention what I claim as new and desire to secure by Letters Patent, is:—

1. In a device of the character described, a body portion, a flexible band having one end adapted to be connected with a suitable part of said body portion, means for compressing said body portion for tightening the band around a suitable support and a lock for connecting the free end of the band with the body portion.

2. In a device of the character described, a body portion, a flexible band having one end thereof connected with a suitable part of said body portion, a lock carried by said body and adapted to hold the free end of said band in engagement with said body portion and means for compressing said body portion for tightening the band around a suitable support and for holding said lock in proper position.

3. In a device of the character described, side plates, a band adapted to pass around a suitable support, one end of said band connected with one of said plates, means for drawing said plates together, and a lock carried by the opposite plate for connecting the free end of said band with the plate.

4. In a device of the character described, side plates, a band having one end secured to one of said side plates, means for drawing said side plates together, one of said plates being formed with an opening through which the other end of the band is passed, and a lock carried by said plate adapted to lock said free end with respect to said plate.

5. In a device of the character described, side plates, a flexible band having one end secured to one of said side plates, a screw passing through said side plates for compressing the same, one of said side plates having an opening through which the free end of the band is passed and a plate or lock carried by said side plate adapted to be swung out of position for allowing the free end of the band to be passed through the opening and suitably actuated for locking said free end to said side plate.

6. In a device of the character described, side plates, a band having an opening, a screw passing through said side plates and said opening in said band, a plate or lock mounted on said screw, one of said side plates having an opening therein through which the free end of the band is adapted to pass, and a nut carried by said screw adapted to be tightened for compressing the side plates and for holding the lock in proper position for locking the free end of the band to the plate, whereby the said band is tightened around the support.

7. In a device of the character described, a body portion comprising side plates, a flexible band fastened thereon, a bolt or screw passing through said side plates, one of the side plates having an opening therein through which the free end of the band is adapted to pass, a plate carried by said bolt and adapted to clamp the free end of the band against said body portion, and nuts carried by said bolt for compressing the side plates, holding the free end of the band in position and drawing the band tight around the support.

8. A ground wire connector, comprising a bolt, a flexible metal strip with one end connected to the bolt, and a pair of plates on the bolt, one of the plates being provided with a slot through which the free end of the strip may pass and be clamped between the faces of the two plates when the bolt is tightened to stretch the strip.

9. A ground wire connector comprising a bolt, a flexible metal strip with one end connected to the bolt, and a pair of members on the bolt between which the other end of the strip may pass and be clamped between said members when the bolt is tightened to stretch the strip.

JOHN C. VOGEL.

Witnesses:
WM. LECHER,
C. D. McVAY.